(12) United States Patent
DeSimone et al.

(10) Patent No.: US 6,212,548 B1
(45) Date of Patent: *Apr. 3, 2001

(54) SYSTEM AND METHOD FOR MULTIPLE ASYNCHRONOUS TEXT CHAT CONVERSATIONS

(75) Inventors: Antonio DeSimone, Lebanon; Elizabeth A. Hohne, Long Branch; Rangamani Sundar, Freehold; Vishwanathan Thiagarajan; Kumar K. Vishwanathan, both of Holmdel, all of NJ (US)

(73) Assignee: AT & T Corp, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/126,162

(22) Filed: Jul. 30, 1998

(51) Int. Cl.[7] .................................................. G06F 13/00
(52) U.S. Cl. ........................ 709/204; 709/206; 709/219; 709/313; 709/329
(58) Field of Search ................................ 709/204, 205, 709/206, 217, 219, 232, 313, 317, 329; 345/339, 340, 347, 330, 331, 332

(56) References Cited

U.S. PATENT DOCUMENTS

| | | |
|---|---|---|
| 4,555,775 | 11/1985 | Pike . |
| 4,761,642 | 8/1988 | Huntzinger . |
| 4,823,108 | 4/1989 | Pope . |
| 5,036,315 | 6/1991 | Gurley . |
| 5,072,412 | 12/1991 | Henderson, Jr. et al. . |
| 5,107,443 | 4/1992 | Simth et al. . |
| 5,329,619 | 7/1994 | Page et al. . |
| 5,408,602 | 4/1995 | Goikas et al. . |
| 5,491,743 * | 2/1996 | Shiio et al. ........................... 709/204 |
| 5,528,671 | 6/1996 | Ryu et al. . |
| 5,633,916 | 5/1997 | Goldhagen et al. . |
| 5,659,692 | 8/1997 | Poggio et al. . |
| 5,694,163 | 12/1997 | Harrison . |
| 5,721,763 | 2/1998 | Joseph et al. . |
| 5,764,916 | 6/1998 | Busey et al. . |
| 5,768,513 | 6/1998 | Kuthyar et al. . |
| 5,774,668 | 6/1998 | Choquier et al. . |
| 5,793,365 * | 8/1998 | Tang et al. ............................ 345/329 |
| 5,828,839 * | 10/1998 | Moncreiff ............................. 709/204 |
| 5,926,179 * | 7/1999 | Matsuda et al. ..................... 345/355 |
| 5,999,208 * | 12/1999 | McNerney et al. .................. 348/15 |

OTHER PUBLICATIONS

Honeycutt and Pike, "Using mIRC, Netscape Chat, and Comic Chat," Chap. 36 in Using the Internet, Third Edition, 1996, pp. 905–925.

"The Undernet Documens Project," from http://www.user–com.undernet.org/documents, 3 pages, updated Mar. 30, 1998.

Oikarinen and Reed, "Internet Relay Chat Protocol," Network Working Group, Request for Comments 1459, May, 1993.

"Activerse Documentation" from http://www.activerse.com/product/ding/v20/docs/toolbar.htm, last modified Jul. 28, 1998.

\* cited by examiner

*Primary Examiner*—Viet D. Vu
(74) *Attorney, Agent, or Firm*—William Ryan

(57) ABSTRACT

A plurality of users communicate in a plurality of real-time text conversations (e.g., "chat sessions") in a client-server message processing environment using messages including a conversation index, a conversation-initiator ID and a list of message recipients. Each conversation is maintained at client terminals in an individual window. Dropping and controlled adding of conversation participants is attended by message updates to other participants. Alternative peer-to-peer message handling reduces the processing burden on servers while allowing clients to perform control and display functions. Voice or other non-text messages are also communicated using described techniques.

15 Claims, 6 Drawing Sheets

FIG. 5A

DAWN

```
┌─────────────────────────────────────┐
│         CHATS FOR ALL      □ ▫ ⊠    │
├─────────────────────────────────────┤
│ IN ROOM:  DAWN, MIKE, DAVE   [ADD]  │
├─────────────────────────────────────┤
│ DAWN > HELLO!                       │
│ MIKE > HI THERE                     │
│ DAWN > HAVE YOU HEARD THE LATEST?   │
│ MIKE > HOLD ON - WAIT UNTIL I ADD DAVE │
│           ** DAVE ADDED **          │
│ DAVE > HI!                          │
├─────────────────────────────────────┤
│ ┌─────────────────────────────────┐ │
│ └─────────────────────────────────┘ │
│                       [ SEND ]      │
├─────────────────────────────────────┤
│                          [ CLOSE ]  │
└─────────────────────────────────────┘
```

FIG. 5B

MIKE

```
┌─────────────────────────────────────┐
│         CHATS FOR ALL      □ ▫ ⊠    │
├─────────────────────────────────────┤
│ IN ROOM:  DAWN, MIKE, DAVE   [ADD]  │
├─────────────────────────────────────┤
│ DAWN > HELLO!                       │
│ MIKE > HI THERE                     │
│ DAWN > HAVE YOU HEARD THE LATEST?   │
│ MIKE > HOLD ON - WAIT UNTIL I ADD DAVE │
│           ** DAVE ADDED **          │
│ DAVE > HI!                          │
├─────────────────────────────────────┤
│ ┌─────────────────────────────────┐ │
│ └─────────────────────────────────┘ │
│                       [ SEND ]      │
├─────────────────────────────────────┤
│                          [ CLOSE ]  │
└─────────────────────────────────────┘
```

FIG. 5C

DAVE

```
┌─────────────────────────────────────┐
│         CHATS FOR ALL      □ ▫ ⊠    │
├─────────────────────────────────────┤
│ IN ROOM:  DAWN, MIKE, DAVE   [ADD]  │
├─────────────────────────────────────┤
│           ** WELCOME **             │
│ DAVE > HI!                          │
│                                     │
├─────────────────────────────────────┤
│ ┌─────────────────────────────────┐ │
│ └─────────────────────────────────┘ │
│                       [ SEND ]      │
├─────────────────────────────────────┤
│                          [ CLOSE ]  │
└─────────────────────────────────────┘
```

*FIG. 6A*  DAWN

```
┌─────────────────────────────────────┐
│         CHATS FOR ALL      □ ▢ ⊠   │
├─────────────────────────────────────┤
│ IN ROOM:  DAWN, MIKE, DAVE   [ADD]  │
├─────────────────────────────────────┤
│ DAWN > CAN YOU BELIEVE IT?          │
│ MIKE > GOTTA GO - BYE               │
│         ** MIKE DROPPED **          │
│ DAVE > TO BAD MIKE HAD TO DROP      │
│ OFF!                                │
├─────────────────────────────────────┤
│  ┌───────────────────────────────┐  │
│  └───────────────────────────────┘  │
│              [ SEND ]               │
├─────────────────────────────────────┤
│                         [ CLOSE ]   │
└─────────────────────────────────────┘
```

*FIG. 6B*  MIKE

*FIG. 6C*  DAVE

```
┌─────────────────────────────────────┐
│         CHATS FOR ALL      □ ▢ ⊠   │
├─────────────────────────────────────┤
│ IN ROOM:  DAWN, MIKE, DAVE   [ADD]  │
├─────────────────────────────────────┤
│ DAWN > CAN YOU BELIEVE IT?          │
│ MIKE > GOTTA GO - BYE               │
│         ** MIKE DROPPED **          │
│ DAVE > TO BAD MIKE HAD TO DROP      │
│ OFF!                                │
├─────────────────────────────────────┤
│  ┌───────────────────────────────┐  │
│  └───────────────────────────────┘  │
│              [ SEND ]               │
├─────────────────────────────────────┤
│                         [ CLOSE ]   │
└─────────────────────────────────────┘
```

SYSTEM AND METHOD FOR MULTIPLE ASYNCHRONOUS TEXT CHAT CONVERSATIONS

FIELD OF THE INVENTION

The present invention relates generally to the field of messaging systems and methods. More particularly, the present invention relates, in one aspect, to methods and systems for maintaining multiple simultaneous asynchronous text (or other) conversations. Still more particularly, aspects of the present invention relate to systems and methods for establishing and maintaining multiple simultaneous asynchronous message sessions between overlapping or non-overlapping sets of users in data communications contexts, such as Internet chat sessions.

BACKGROUND OF THE INVENTION

The Internet and many on-line information services provide electronic mail (e-mail), conferencing and chat services, and the ability to access remote computers for sending and retrieving files. E-mail, perhaps the most widely used of Internet and on-line service applications, has an (often desirable) inherent "off-line" time delay characteristic.

Internet Relay Chat (IRC) or, simply "chat" provides informal communications among users of data network facilities. Chat allows two or more users to converse by exchanging text messages, typically through a "channel" or virtual "chat room" maintained on one or more chat servers and accessed via an on-line service or using general purpose chat "client" software executing at a user terminal, workstation or personal computer. Only chat "participants" connected (typically through a telephone line modem) to the on-line service or other chat environment provided by one or more chat servers, can take part in the chat. Chat room "conversations" are displayed as text in a chat room window on a participant's display screen, usually accompanied by a list of chat participants. The text displayed at a participant's terminal usually includes a history of the conversation from the time that the viewing participant joined the chat room. Entering particular chat rooms is typically effected using a list or menu of currently available chat rooms. Exiting a chat room is usually as simple as closing the chat window. Extensions of the basic chat model of communications permit use of voice (or other audio), video and other message content.

Chat Rooms (including private chat rooms, described below) are established on chat servers in advance of text conversations, and allow many users to communicate via messages. Any user may elect to join a chat room (become a participant), subject to prior subscription or registration procedures imposed by the on-line service provider or operator of the chat server(s). Many versions of chat client software, with varying functionality and communications protocols, are widely available on the Internet for download. Participants in a chat room receive all messages sent to the chat room and can decide to contribute input messages according to personal preference.

Private chat rooms are set up by a participant seeking to have private text communications with a selected one or more other participants in an existing chat. Toward this end, the initiating participant typically sends a "query" or similar message to another participant with whom the initiating participant wishes to privately communicate. A recipient of this query agrees to take part in a private chat with the initiating user by responding to the message. Others may be added in similar fashion. The server provides a separate chat room or channel not accessible by anyone not invited by those in the established private chat room.

Instant Messaging (IM) allows a user to launch a message to another user. Variants of IM permit a notice to be sent to others (e.g., those on a "buddy list") when a particular user logs on to a server, even without joining a chat or other two-or-more-person conversation. Users announce their availability to receive messages by electing options or submitting system parameters in advance. The sender of an instant message determines who will receive the message.

While the foregoing and other features of e-mail, chat and instant messaging have proven very useful in a number of contexts, these systems suffer from a number of real time limitations. For example, current chat environments limit users to participation in only one multiple-party (three or more participant) real-time chat room at a time. Users may participate in more than one conversation in real time, if these are two-way conversations. Likewise, a user may pursue multiple conversations (strings of messages) with multiple users, but only over an elapsed time period using multiple windows for conversation events, participation, and display.

SUMMARY OF THE INVENTION

Limitations of the prior art are overcome and a technical advance is made in accordance with the present invention described in illustrative embodiments herein.

In accordance with one aspect of the present invention, a user maintains multiple simultaneous real-time chat sessions with a plurality of other participants using a single client residing on a personal computer, workstation or terminal (collectively, "terminal"). Advantageously, each of the conversations is presented in a separate window on the terminal, and the user can select a window for text input in the usual way.

In accordance with an illustrative embodiment, a technique for labeling and addressing messages is introduced and applied in a data network with a technique for presenting conversation events, messages, and history. These and other features of illustrative embodiments permit dynamic creation of multiple simultaneous asynchronous conversations, each among multiple users, in a distributed manner—all in real time. Participants in component conversations may change over the life of the conversation and the conversations will include overlapping sets of users.

Participants send messages in the context of a particular conversation. In accordance with an illustrative system embodiment, these conversations and communications events (e.g., adding a participant, removing a participant) among multiple users are tracked in a completely distributed manner and in real time. The conversation data, including events, messages, and history, is presented to the user in an organizational structure that uniquely identifies the conversation.

While participants in several simultaneous real-time conversations may be overlapping to various extents, in one class of embodiments the set of messages sent to participants in one or more of the conversations is mutually exclusive of the set of messages sent to participants in one or more other conversations. A useful illustrative example is a session including a negotiation between two (or more) principal negotiators, each of whom has background advisors. The respective advisors take part in "whisper conversations" with their principal(s) that cannot be observed ("heard") by the opposing negotiator or opposing advisors, or even others on the same side of the negotiation. Side conversations, e.g., between opposing advisors seeking to resolve underlying technical or procedural points, can be pursued under the observation of other advisors and/or principals in separate chat windows. Advantageously, advisors on the same side can selectively pursue such side conversations as well.

BRIEF DESCRIPTION OF THE DRAWING

The above-summarized description of illustrative embodiments of the present invention will be more fully understood upon a consideration of the following detailed description and the attached drawing, wherein:

FIGS. 4A–C, 5A–C and 6A–C show illustrative views of windows at typical client terminals during various phases of establishing, maintaining and removing from conversations.

DETAILED DESCRIPTION

Terminology

It proves useful to introduce a set of terms as a basis for the detailed description given below. For this purpose the following terms and respective meanings will be applied:

Session: all potential participants in on-line conversations. Thus, in the negotiation example mentioned above, all users on both sides are part of the session. In other cases the session may include a group of users such as those logged onto an on-line service or similar chat room, or included in a "buddy list" maintained by a user.

Conversation: a string of messages among participants in a session, presented within a window at each participant's display. Non-participants in a conversation do not receive messages in a conversation, nor can non-participants send messages to participants in the context of the conversation. A conversation has a history that may be different for different participants.

Message: information generated by a participant that is added to a conversation history. Also includes control information including conversation id and a list of participants in a conversation.

Initiating Message: the first message in a conversation.

Augmenting Message: a message that indicates a participant has been added to a conversation.

Figure 1:
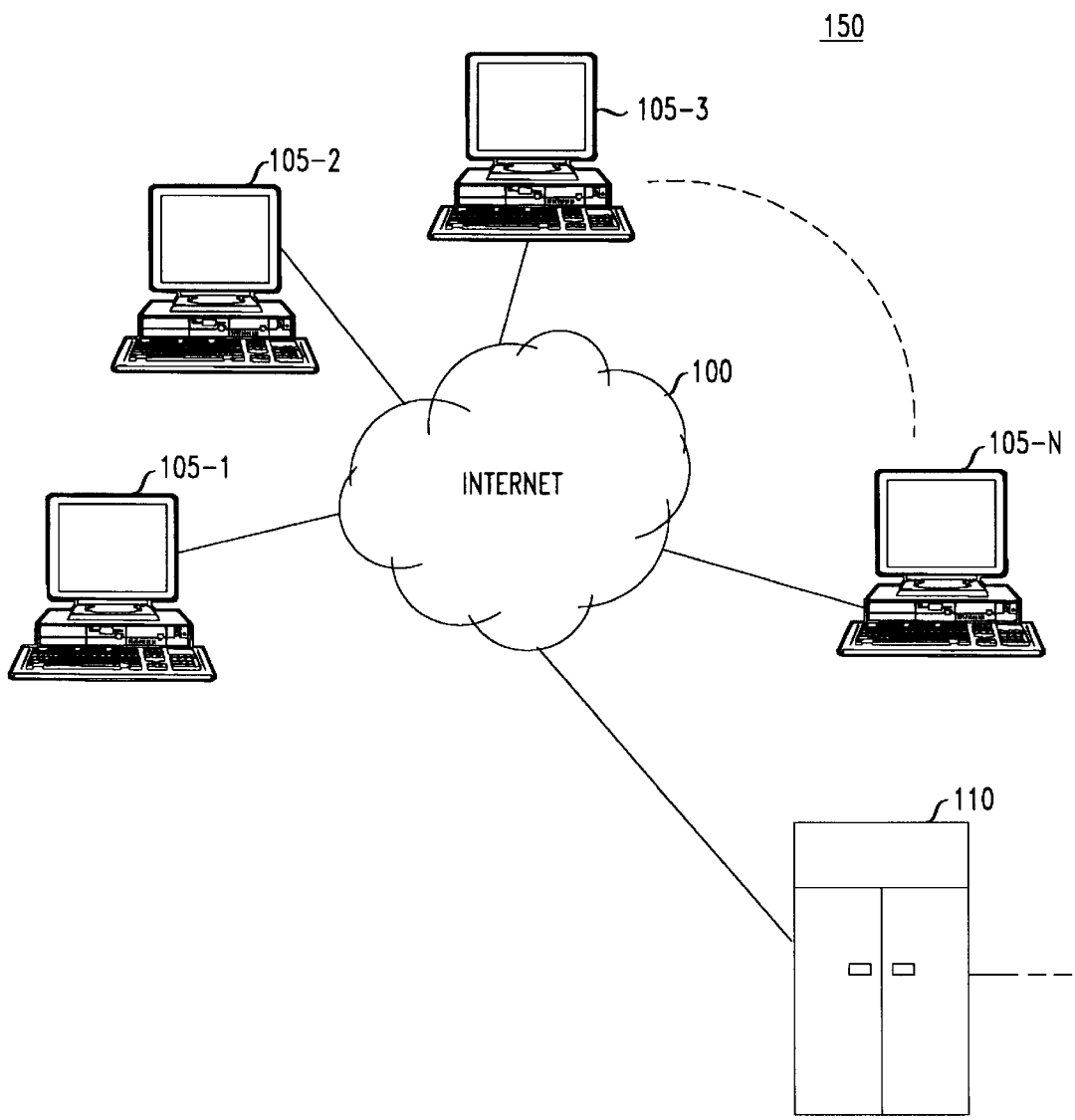
FIG. 1 is an overall view of a data network in which embodiments of the present invention are used and practiced.

Pruning Message: a message that indicates a participant has been removed from a conversation Illustrative System Overview FIG. 1 shows an illustrative data communications system 150, such as the Internet with attendant access facilities, in which the present invention may be applied. Of course network 150 may be an on-line service network, or any other real-time message-handling network. In network 150 a representative plurality of personal computers, workstations, or terminals (collectively "terminals"), 105-i, i=1, 2, ..., N are shown connected by way of telephone lines or other access paths through a data network (illustratively, the Internet) 100 to a server 110. N can be any positive integer, subject to transmission and processor capacity limitations.

Server 110 is shown with dashed lines on its right to indicate that the server functions may be distributed over an arbitrary number of networked cooperating servers. Each terminal 105-i is connected (through standard access facilities) to an associated server. In some cases all terminals will be associated with the same server, but more generally one or more terminals will be connected to each of a group of servers. In typical operation, the terminals 105-i execute client software for cooperating with server software running on a respective server 110 to enable chat functionalities. In one illustrative case, client and server software will be based on well-known chat components such as mIRC client and server software by mIRC Co. Ltd. which is available on the Internet, e.g., at http://www.mirc.co.uk, and from other distributors.

Further information about well-known chat software and procedures is available from the Undernet User Committee web site at www.user-com.undernet.org/documents/. Of particular note is Network Working Group Request for Comments: 1459, by J. Oikarinen and D. Reed, May, 1993, available at the Undernet web site. This latter document presents a version of the Internet Relay Chat (IRC) Protocol that has provided important bases for current chat implementations. Other particular client/server implementations of various chat functionalities include several quIRC chat software modules.

Standard chat methodologies, including those recited above, or used in other chat systems well known to the art, or described in documents well known in the art, are modified and extended in accordance with aspects of the present invention to realize desirable inventive functionalities. Features and operations of illustrative systems, methods and protocols for achieving advantages of the present invention will be described below.

Message Handling Architectures and Protocols

Figure 2A:
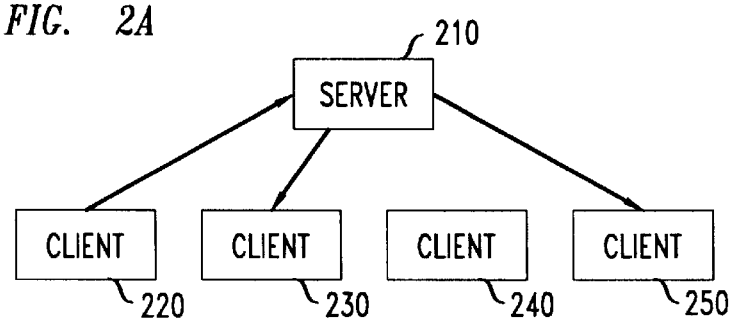
FIG. 2A shows an illustrative client-server message handling architecture for use with embodiments of the present invention.

A principal mechanism for communicating messages and managing windows for viewing chat conversations in accordance with illustrative embodiments of the present invention is the well-known client-server architecture, as modified in the manner described below. FIG. 2A illustrates a simple client-server architecture for message handling in accordance with one class of embodiments of the present invention. In FIG. 2A, a snapshot of activity among a sampling of network elements, messages are seen to be sent from one client (illustratively client 220) to a server 210. At server 210 processing of the message is performed to effect control and distribution of messages in a conversation (to clients 230 and 250, for example). At other times, clients such as 230, 240 or 250 originate messages that are processed by server 210 and forwarded, as appropriate, to other clients. In accordance with aspects of embodiments of the present inventive contributions, a client maintains a plurality of simultaneous plural-participant conversations.

Alternatively, many of the message handling and window control operations used in embodiments of the present invention are advantageously accomplished using a peer-to-peer interconnection among clients. Such a system arrangement is shown in a simplified example in FIG. 2B, where clients 260, 270, 280 and 290 are shown selectively communicating messages. Because a message format is used, in accordance with one aspect of the present invention, that always allows a receiving client to identify the chat conversation with which a message is associated, much of the routing and window control functionality can be left to the client software at user terminals. Aspects and advantages of such peer-to-peer interconnection will be discussed below. As with the presently modified client-server architecture, a client can maintain plural simultaneous conversations, each with a plurality of other participants.

Initially, however, it will be assumed for illustration that a client-server architecture is used to permit clients to exchange messages through one or more respective servers. Each client is associated with a particular server, which server may be shared among clients or co-located with a designated client. Such a client-server arrangement can be considered to be essentially a star configuration if interconnected servers, if any, are considered as one server. This latter condition will be assumed in discussions of client-server system organizations in the sequel. That is, it will be assumed that all servers in a multi-server network will maintain, or have ready access to, lists of participants and other message handling information maintained at servers to control the processes described below. Such exchange of information between servers is commonplace in multi-server environments.

In beginning a discussion of typical message handling operations in accordance with the present invention, it will be recognized that any message conversation has an initiator and a set of participants. Further, any message has a sender and a set of recipients that is a superset of the set of participants. In accordance with one aspect of some illustrative embodiments of the present invention, a message that includes a set of recipients that is a proper superset of the set of participants advantageously changes the set of participants in the conversation to include all the recipients of the message. A message therefore includes an identification of the existing participants in the conversation, and perhaps others being added by the message.

In accordance with illustrative embodiments of the present invention, characteristics desirably included in any message from a message-originating user are message elements identifying (i) the originating user, (ii) all recipients of the message, and (iii) a conversation index.

Thus, each user in a conversation has a unique identifier (unique across the session, at least) associated with the user. This user identifier may be assigned specifically for the session or may be persistently associated with the user. Examples include an e-mail address or an Internet Protocol (IP) address, but nicknames are common in chat contexts. Also, as noted, it proves advantageous to cause all conversations initiated by a sender have a unique conversation index. The combination of sender's ID and conversation index are advantageously used by all recipients of a message to determine the conversation with which the message is associated. The system will have unique names for each conversations generated by the initiators and, as is usual for chat rooms, unique names for each participant visible to each participant.

In one illustrative embodiment, any participant can add a new participant at any point in the conversation. This conversation event advantageously triggers a message to all other participants, causing their view to be updated. Any participant may choose to remove himself or herself from a conversation. As in the case of adding a participant, this event conveniently triggers a view-updating message to all participants. These and other typical message characteristics and operations will now be illustrated in an illustrative example involving the initiation of a chat room, the subsequent use of the chat room to broadcast to participants, and the removal of participants from the chat room.

Message Formats

The ASCII message protocol conveniently used to describe the messages exchanged between the client and the server in many chat environments is adopted for the present illustrative embodiments. Because many aspects of existing chat message protocols will prove useful in employing the present invention, elements useful in introducing the above-recited and other inventive features will be used in augmenting existing formats and protocols. In any event, it will be understood that many particular message formats may be adopted for use with the present inventive contributions, as circumstances may allow or dictate. To provide a common illustrative format, it proves useful to employ the following message elements:

[Head1 NL]+NL NL [Name:Value]* NL NL NL * where NL (newline) is also represented as \n. A message is therefore taken as complete when it has at least

[HEAD1 NL]+NL NL and an optional set of (name, value) pairs.

Some Example Messages

A sequence of messages will now be shown and discussed to illustrate aspects of chat methodology used in illustrative embodiments of the present invention. In these example messages, a two-line command sequence appears as, for example,

2

11.

The syntax and semantics for all instances of this useful, but arbitrary, command sequence will not be presented, but the command function and results appear in the messages and associated discussion. Other particular commands and command sequences will prove useful in particular contexts, as will be apparent to those skilled in the art.

For purposes of the illustrative example messages, it is assumed that the session involves users Dawn, Mike and Dave. Initially, Dawn is preparing to initiate a conversation with Mike. The following illustrative initiate chat message reflects Dawn's use of her client software from her terminal to indicate that she would like to initiate a chat. The message is sent from her client to a communications server.

Message-Begin

<Session Id>

2

11

ChatRoomName:<User Specified Room Name>

UID:<User's unique Id for the Session>

UIDNameList:<comma separated list of participants' UID for this

Chat Session excluding the Chat room Creator>

Message-End

Figure 3:
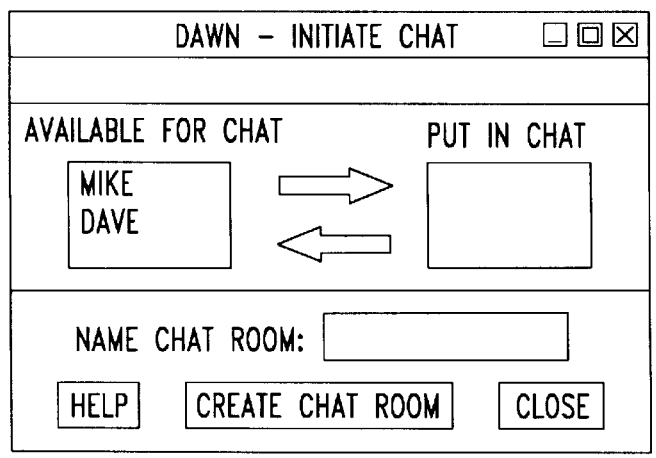
FIG. 3 shows an illustrative chat initiation window for use by a message-initiating user at a client terminal.

Information for this message is conveniently entered in a window created by the client software at Dawn's terminal, e.g., in response to selecting an "Initiate Chat" button from a menu or the like presented by an opening (or other) screen on Dawn's client. An example window of this type is shown in FIG. 3. Because the client software is aware of the initiator's (Dawn's) User ID, it is not necessary for her to explicitly enter this UID.

When the initiate chat message given above is received at the server, it is parsed and processed in accordance with the following illustrative pseudo code:

```
Code-Begin
If (ChatRoomName+Creator-Id already present in the list of Chat Rooms)
{
    send the following error response for the Chat Room
Creation Request:
    Message-Begin
    <Session Id>
    2
    12
    errorCode:6 errorstring:Duplicate Chat Room
    ChatRoomName: <ChatRoomName+Creator-Id> UID:<User's unique Id
    for the Session> UIDList:<comma separated list of participants' UID for
    this Chat Session excluding the Chat room Creator)
Message-End
}
else
{
    Add the Chat Room to the list of active Chat Rooms; pair; Extract the
List of participants from the NickNameList N/V pair;
    Send the following Response Message to the Chat Room Creator and all
the participants of the chat room:
Message-Begin <Session Id>
2
12
    ChatRoomName:<ChatRoomName+Creator-Id> UID:<User's unique Id for the
    Session> UIDList:<comma separated list of participants' UID for this Chat
    Session excluding the Chat room Creator)
    Message-End
}
    When the message is received by the client software residing on conversation
participants' terminals, the following processing illustratively transpires:
    // processing by the Creator
    if (creation of chat room is successful)
    {
        if (there is no other chat room with the same name exist)
        {
            display a chat room with just the room name
        else
        {
            display a chat room with the room + creator's id
            modify the name of the other chat room with the same name to
            room name + creator's id (this is creator of this room)
        }
    }
    else
    {
        display an error message informing the error
    }
    // processing by rest of the participants
    if (there is no other chat room with the same name exist)
    {
        display a chat room with just the room name
    }
    else
    {
        display a chat room with the room + creator's id
        modify the name of the other chat room which has the same
        name to room name + creator's id (this is creator of this room)
Note that the participants do not ordinarily receive an error message for creation
of a chat room.
```

Figure 4A:
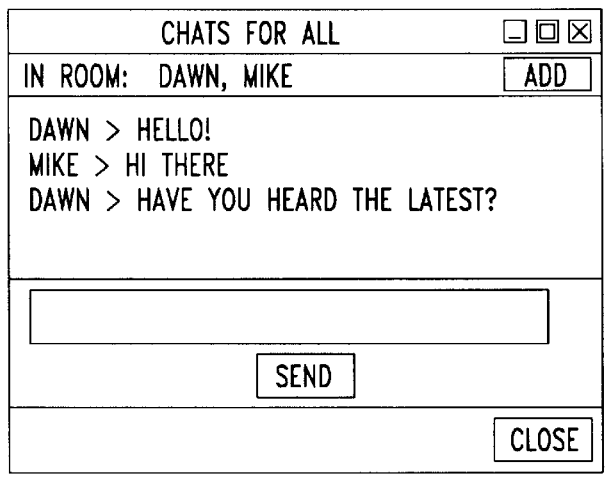
Figure 4B:
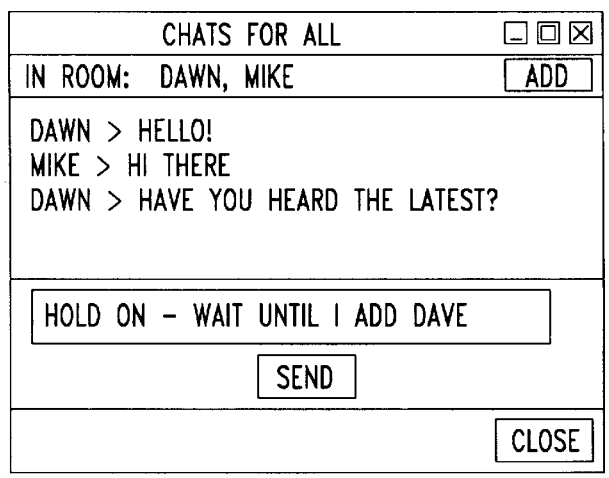
Figure 4C:
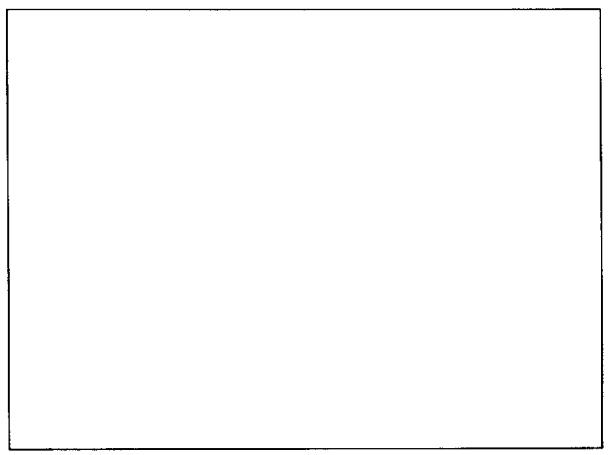

FIGS. 4A–C illustrate a continuation of the foregoing example. There, Dawn and Mike view their Conversation in respective windows. Mike is preparing to send a message to Dawn indicating that he is about to add Dave to the chat. In accordance with one illustrative embodiment of the present invention, any participant in a chat room can add a new participant to that chat room. To effect the desired addition the following message is sent by a client, such as the client at Mike's terminal, to the Server:

```
Message-Begin
<Session Id>
2
13
ChatRoomName:<ChatRoomName+Creator-Id>
```

```
    UID:<user issuing the request>
    UIDList:<comma separated list of participants' UID to be added to this chat
    room>
    Message-End
Upon receiving the above message, the server performs the following processing:
    Code-Begin
    If (ChatRoomName+Creator-Id does not exist)
    {
        send the following error response for the Chat Room Creation Request:
        Message-Begin
        <Session Id>
        2
        14
        errorCode:7
        errorString:Invalid chatroomname
        ChatRoomName:<ChatRoomName+Creator-Id>
        Message-End
    }
    else if (user issuing the request is not a participant of this chat room)
    {
        send the following error response for the Chat Room Creation Request:
        Message-Begin <Session Id>
        2
        14
        errorCode: 8
        errorString:Participant does not exist in the room
        ChatRoomName:<ChatRoomName+Creator-Id>
        Message-End
    }
    else
        extract the list of participants from the message, add them to the
        list of participants in the room. Broadcast the following message
        to all the participants in the room.
        Message-Begin
        <Session Id>
        2
        14
        ChatRoomName:<ChatRoomName+Creator-Id>
        UID:<user who issued the add request>
        UIDList:<comma separated list of UIDs for participants who have been
        added to this chat room>
        Message-End
    }
    Upon receiving the above message the client software residing on conversation
participants' terminals performs the following:
    // Processing by the user who issued the add if adding the participant
    was successful
    {
        add this participant to list of active users in the corresponding
    chat room
    }
    //processing by the client for the participant who was added
    if (there is no other chat room with the same name exist)
    {
        display a chat room with just the room name
    else
        display a chat room with the room + creator's id
        modify the name of the other chat room which has the same
        name to room name + creator's id (this is creator of this room)
    }
    //processing by rest of the participants add this participant to list of
    active users in that corresponding chat room.
```

FIGS. 5A–C show screens at the terminals of Dawn, Mike, and Dave for viewing of their conversation after Dave has been added.

Broadcasting a Message in a Chat Room

Any Participant in a chat room can broadcast a message to all participants in that chat room. The following illustrates a typical process in which a message is sent by a client to the server:

```
Message-Begin
<Session Id>
2
19
ChatRoomName:<ChatRoomName+Creator-Id>
UID:<user broadcasting the message>
Message:<message to be broadcast>
Message-End
Upon receipt of the above message the receiving server performs the following:
Code-Begin
If (ChatRoomName+Creator-Id does not exist)
{
    send the following error response for the Chat Room Creation Request:
    Message-Begin
    <Session Id>
    2
    20
    errorCode:7
    errorString:Invalid chatroomname
    ChatRoomName:<ChatRoomName+Creator-Id>
    Message-End
}
else if (user issuing the request is not a participant of this chat room)
{
    send the following error response for the Chat Room Creation Request:
    Message-Begin
    <Session Id>
    2
    20
    errorCode:8 errorString:Participant does not exist in the room
    ChatRoomName:<ChatRoomName+Creator-Id>
    Message-End
}
else
{
    get the chat room identifier, broadcast the following message to all
    the participants.
    <Session Id>
    2
    20
    ChatRoomName:<ChatRoomName+Creator-Id>
    UID:<user broadcasting the message>
    Message:<message to be broadcast>
    Message-End
}.
```

Upon receiving the above message the client software residing on conversation participants' terminals performs the following processing:

// processing by all participants in the chat room display the message received from that user who had sent it.

Participant Leaving a Chat Room

FIGS. 6A–C show screens at the terminals of Dawn and Dave for viewing of their conversation after Mike has removed. Mike's conversation window is shown as closed in FIG. 6B. A participant in a chat room session can leave a chat room at any time. When a participant desires to leave a chat room the client for that participant recognizes the user's wish to be removed (as signaled, e.g., by a mouse click or the like on a button) and sends the following message to the Server:

```
Message-Begin
<Session Id>
2
23
ChatRoomName:<ChatRoomName+Creator-Id>
UID:<user who is leaving the room>
Message-End
Upon receiving the above message the server platforms the following processing:
Code-Begin
If (ChatRoomName+Creator-Id does not exist)
{
    send the following error response for the Chat Room Creation Request:
    Message-Begin
    <Session Id>
    2
```

```
        24
        errorCode:7
        errorString:Invalid chatroomname
        ChatRoomName:<ChatRoomName+Creator-Id>
        Message-End
}
else if (user issuing the request is not a participant of this chat room)
{
        send the following error response for the Chat Room Creation Request:
        Message-Begin
        <Session Id>
        2
        24
        errorCode:8
        errorString:Participant does not exist in the room
        ChatRoomName:<ChatRoomName+Creator-Id>
        Message-End
}
else
{
        broadcast the following message to all of the participants in the session.
        <Session Id>
        2
        24
        ChatRoomName:<ChatRoomName+Creator-Id>
        UID:<user who is leaving the room>
        Message-End
```

Now, remove the participant from the list of participants in that session, so that any other messages for this chat room will not be broadcast to that participant.

Note that a mechanism is present to ensure that a request to leave a chat room from a participant has to be confirmed and that only that concerned participant is issuing the request. This ensures that not any participant in that chat room can drop anybody else.

If the number of participants in the session is zero, then the chat room is destroyed.
}

Upon receiving the above message processing at the client software residing on conversation participants' terminals proceeds as follows:
  // processing by the participant who attempted to leave if the attempt to leave the chat room was successful, destroy the chat room display.
  // processing by rest of the participants
  If a participant has left the chat room successfully, remove this participant from the active list of participants in that chat room.

Multiple Chat Rooms on a Single Client

From the foregoing examples of the creation and processing of chat messages in accordance with embodiments of the present invention, it becomes clear that an initiator of a first chat conversation can originate a second or subsequent conversation. Through the expedient of choosing a distinct conversation index upon initiating a subsequent conversation, messages for different conversations can be readily separated. Likewise, participants in the respective conversations are initially chosen by the initiator and can be augmented by the initiator and, illustratively, others after they become participants.

Figure 7:
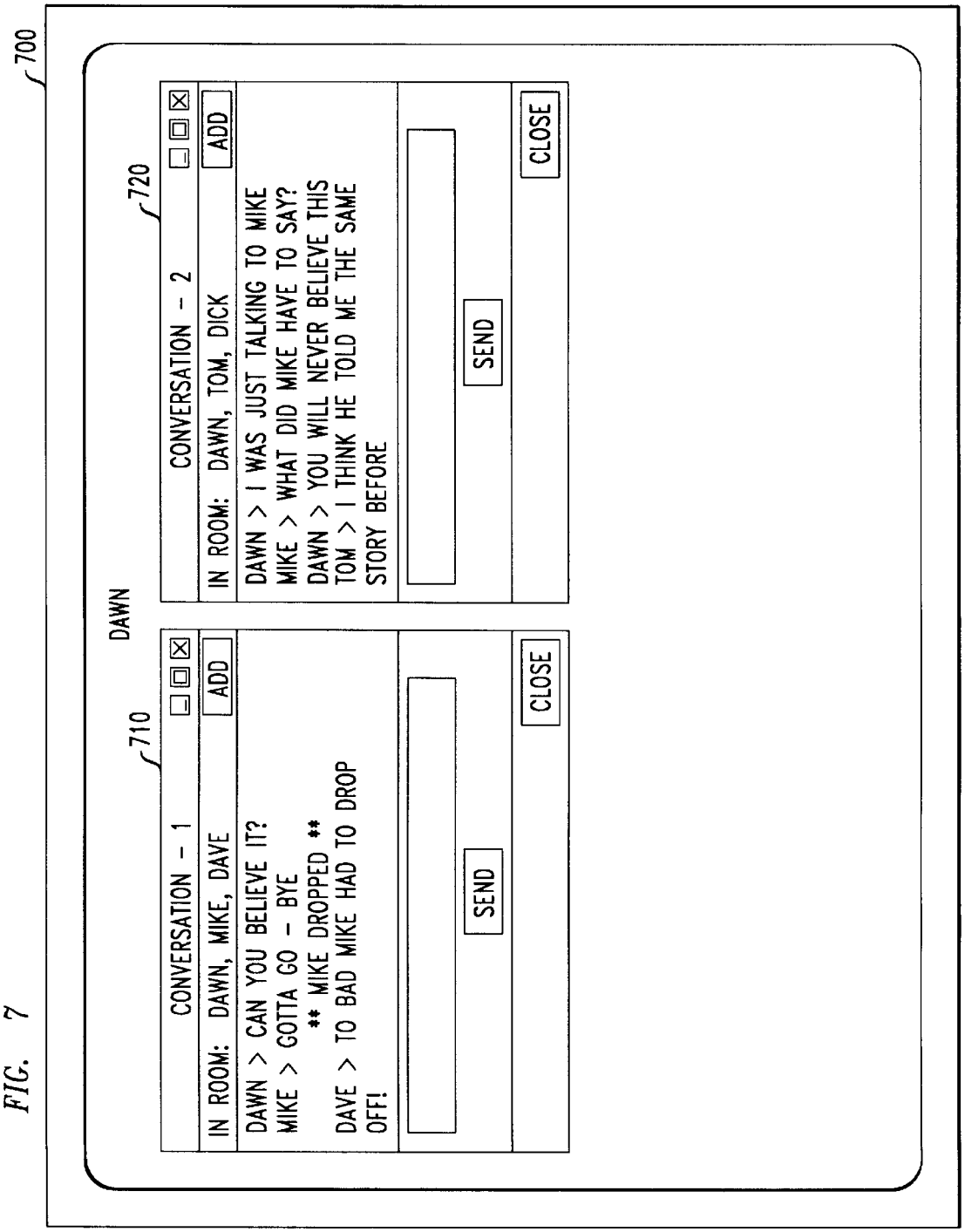
FIG. 7 shows a terminal display with a plurality of simultaneous real-time multiple party message conversations in respective windows.

Similarly, other session users can become initiators and designate other respective recipient lists (members of which become participants). An initiator of a first conversation can readily become a participant in a conversation initiated by another user, merely by being identified in a recipient list by an already existing participant. FIG. 7 shows a display 700 at a terminal for a user (here the above-mentioned Dawn) including separate windows 710 and 720. Window 710, in turn, is seen to display messages in a conversation between Dawn, Mike and Dave, as in a preceding example. Window 720, on the other hand, reflects an ongoing conversation between Dawn, Tom and Dick. While Dawn provides the only conversation participation overlap between the two conversations, she (or one of the other participants in one of the conversations in windows 710 or 720) can add another participant from one of the conversations to the other conversation. Of course, any of the participants can add additional users who are not present participants of either conversation. Likewise, Dawn or any of the other participants can initiate a new conversation through the mechanism described above.

In other particular embodiments, additional conditions or controls on adding new participants are readily effected. For example, in a client-server message handling system, an augmenting message can be tested against a list of authorized augments, including, in some cases, only the conversation initiator. When a submitted augmenting message is received at a server and found not to be originated by an authorized augmentor-participant, the proposed augmenting is refused; the newly proposed addition to the participant list is rejected. Other particular policies can be imposed to reflect the nature of the conversations and participants. For example, additions to purely social chat contexts can be considerably relaxed as compared with conversations involving a need for privacy or secrecy.

Each simultaneous, real-time, multiple-participant (including three-or-more-participant) conversation is reflected at a user's terminal by a separate window. The respective conversation windows can be overlapped, and are otherwise manipulated in well-known ways (i.e., in respect of sizing, backgrounding, etc.) by standard window-handling client software.

The overall session population can likewise be a factor in administering admission policies. Thus, members of this overall user group may have already been prescreened, as by inclusion on one or more "buddy lists" or have been preselected by participation in side message or voice conversations leading to invitations to join the overall (or a particular identified conversation) session. Even with such pre-screening, however, it proves useful to impose conditions or controls on entry by potential participants in particular conversations. Thus the negotiation example given above illustrates the possible need for controls of varying restrictiveness. In some cases, passwords or other keywords may be required before an augmentation message will be honored. Such additional control functions are easily added in message dialogues between clients and respective servers through analysis of incoming messages, including augmenting messages, for the presence of additional descriptive or authorization information.

While the preceding detailed description has used the client-server model of message processing for purposes of discussion, it will be apparent to those skilled in the art that the message analysis and establishment of lists and controls for particular conversations may be effected primarily at receiving clients rather than at servers. Thus, for example, the peer-to-peer architecture of FIG. 2B may be used.

It will be appreciated from the foregoing discussion and examples that when a message is launched in the context of an existing or initiated chat conversation that contains the conversation ID, the message originator's ID and the identification of the intended recipients, the latter information can be used by network routers (including respective servers) to route the messages to the terminal(s) of the indicated addressees.

Figure 2B:
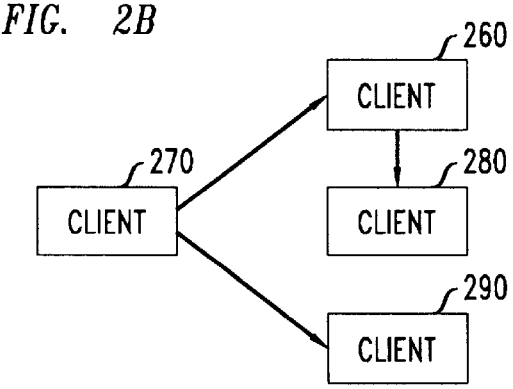
FIG. 2B shows an illustrative peer-to-peer message handling architecture for use with embodiments of the present invention

The receiving local clients in the peer-to-peer system organization of FIG. 2B then use the conversation ID and originator ID to identify the conversation and direct message content and control information to local client processing. Thus, for example, receipt at a receiving client of a message with a new conversation ID and originator ID will typically cause that client to establish a new message window, provided, of course, that any pre-agreed security or interest criteria are satisfied to the satisfaction of the receiving client. Then, when future messages having the same conversation ID and originator ID are received they are directed by the receiving client to the associated window and related control processes—all at the client. It will be appreciated by those skilled in the art that use of the peer-to-peer system organization with message handling of the type described above in the examples will in many cases significantly reduce the processing burden on servers and permit improved real-time performance. That is, the servers act primarily as message forwarding nodes in peer-to-peer network operation. Additionally, particular users will have more immediate control over execution of local client software for purposes of introducing admission controls, forwarding of messages to other locations and other functions. Through the use of menus, parameter input screens and the like, client software at a user terminal permits the user greater control over receipt and display of messages.

Other message handling features, methods and associated systems for practicing such methods, all within the spirit and scope of the present invention, will occur to those skilled in the art based on the foregoing descriptions. For example, though the preceding description has proceeded in terms of text messages, those skilled in the art will apply the present inventive teachings in communicating a variety of messages, including voice (or other audio), video (or other graphic) messages and in communicating mixed-mode messages or messages with a variety of attachments.

What is claimed is:

1. In a data network comprising a plurality of nodes, at least some of which nodes are connected to terminals, each terminal associated with a user, a method for communicating between users in a plurality of simultaneous text chat conversations, each chat conversation comprising a selected plurality of said users (participants) to the exclusion of other non-participant users, the method comprising, separately for each of said plurality of simultaneous text chat conversations, the steps of maintaining at a first set of said terminals a plurality of windows viewable by an associated user, each of said windows being associated with one of said chat conversations, receiving at one of said first set of terminals a message comprising an originator ID and a conversation ID, and based on said message comprising said originator ID and said conversation ID, updating the conversation associated with a respective one of said windows at said one of said terminals.

2. The method of claim 1 wherein said one of said first set of terminals is associated with a user having a first recipient name, said message received at said one of said first set of terminals including a list of recipients comprising said first recipient name, and said data network comprises at least one node performing the step of forwarding said message to said one of said first set of terminals.

3. The method of claim 2 wherein said at least one node is a server node and wherein said server node performs said forwarding by performing the steps of forming a list of participants for each active chat conversation identified by an initiating user ID and a conversation ID, comparing the list of recipients in a received message with the stored list having the same initiating user ID and a conversation ID, and forwarding said received message to said first set of terminals when said list of recipients matches said stored list having the same initiating user ID and conversation ID.

4. In a data network comprising at least one communications server and a plurality of terminals, each said terminal associated with a user, each said terminal communicating with a respective communications server, a method for communicating between users in a plurality of simultaneous text chat conversations, each simultaneous text chat conversation comprising a selected plurality of said users (participants) to the exclusion of other non-participant users, the method comprising, separately for each of said plurality of simultaneous text chat conversations, the steps of receiving at a first communications server an initiating message from a initiating user terminal associated with said first communications server, said initiating message comprising a list of initial recipients in a chat conversation and a chat identifier uniquely identifying a new chat session, establishing at said first communications server and each of said communications servers associated with at least one of said initial recipients a chat participant list for said new chat conversation, said chat participant list comprising said initial list of chat recipients and said initiating user, at each of said communications servers associated with a participant of a chat conversation, upon receipt of a subsequent message from a participant on said distribution list, said subsequent message comprising said chat identifier and a list of intended recipients of said message, adding to said participant list any intended recipient not on said participant list at each of said communications servers associated with an intended recipient, and forwarding said subsequent message to users on said participant list.

5. The method of claim 4 further comprising the steps of upon receipt at a second communications server of a message identified by a chat identifier and a list of intended recipients, said list of intended recipients including a user associated with said second communications server, establishing a chat participant list at said second communications server for said identified chat session, said chat participant list comprising all of said chat recipients and the originator of said message.

6. The method of claim 4 further comprising steps performed at a user terminal upon receipt of a message comprising a chat identifier and a list of current participants, displaying in a display area uniquely associated with said chat identifier any content of said message and said list of current participants.

7. The method of claim 4 wherein said at least one communications server comprises a plurality of interconnected servers, and wherein each of said interconnected servers maintains a chat participant list for said new chat conversation, said chat participant list initially comprising said initial list of chat recipients and said initiating user.

8. In a data network comprising a plurality of nodes, at least some of which nodes are connected to terminals, each terminal associated with a user, a method for communicating between users in a plurality of chat conversations, each chat conversation comprising a selected plurality of said users (participants) to the exclusion of other non-participant users, the method comprising, separately for each of said plurality of chat conversations, the steps of maintaining at each of a first set of said terminals a first window viewable by an associated user, said window being associated with a first of said chat conversations, receiving at each of said first set of terminals first sequences of messages, each comprising a conversation initiator ID and a conversation ID for said first chat conversation, based on said first sequences of messages, updating the status of said first window at each of said first set of terminals, maintaining at each of at least a second set of said terminals a respective at least a second window viewable by an associated user, said at least a second windows being associated with respective ones of said chat conversations, receiving at each of said at least a second set of terminals respective sequences of messages, each comprising a conversation initiator ID and a conversation ID for a respective chat conversation, based on each of said at least a second sequences of messages, updating the status of said respective one of said at least a second window at each of said at least a second set of terminals.

9. The method of claim 8 wherein said first set of terminals and said at least a second set of terminals are not mutually exclusive, whereby at least some of said terminals maintain a plurality of windows, each window being associated with a respective one of said chat conversations.

10. The method of claim 8 wherein at least one of said nodes is a server node, said at least one server node(s) performing the steps of receiving messages from associated terminals, and forwarding said received messages in accordance with a list of recipients included in said messages.

11. The method of claim 10 further comprising at said server the steps of comparing the list of recipients in a received message with a stored list associated with the conversation initiator ID and conversation ID for said received message, and forwarding said received message to said list of recipients in said received message when said list of recipients matches said stored list.

12. In a data network comprising a plurality of nodes, at least some of which nodes connected to terminals, each terminal associated with a user, a method for are communicating between users in a plurality of chat conversations, each chat conversation comprising a selected plurality of said users (participants) to the exclusion of other non-participant users, the method comprising, separately for each of said plurality of chat conversations, the steps of maintaining at each of a first set of said terminals a first window viewable by an associated user, said window being associated with a first of said chat conversations, receiving at each of said first set of terminals first sequences of messages, each comprising a conversation initiator ID and a conversation ID for said first chat conversation, based on said first sequences of messages, updating the status of said first window at each of said first set of terminals, maintaining at each of at least a second set of said terminals a respective at least a second window viewable by an associated user, said at least a second windows being associated with respective ones of said chat conversations, receiving at each of said at least a second set of terminals respective sequences of messages, each comprising a conversation initiator ID and a conversation ID for a respective chat conversation, based on each of said at least a second sequences of messages, updating the status of said respective one of said at least a second window at each of said at least a second set of terminals.

13. A communications server supporting chat conversations among a plurality of user terminals comprising means for receiving an initiating message from one of said user terminals for each of said chat conversations, said initiating message comprising a conversation ID, a conversation initiator ID and an initial list of recipients, means uniquely associated with each combination of said conversation ID and said conversation initiator ID for storing said respective initial list of recipients, means for receiving chat messages from a plurality of user terminals, each such message comprising a conversation ID, a conversation initiator ID and a list of recipients, means for comparing the list of recipients in each message having a particular combination of conversation ID and conversation initiator ID with the stored list of recipients associated with said particular combination, and means for forwarding said message having said particular combination to said list of recipients in said message when said list of recipients matches those stored in association with said particular combination.

14. The server of claim 13 further comprising means for replacing said stored list associated with said particular combination with said recipient list recipient list in said message having said particular combination whenever said recipient list in said message having said particular combination is a proper subset of said stored list.

15. A user terminal for use in a data communications system supporting a plurality of simultaneous text chat conversations among a plurality of user terminals, each chat conversation being conducted among a selected plurality of users (participants) at respective user terminals to the exclusion of other non-participant users, said terminal comprising means for displaying a plurality of text chat conversation windows, means for receiving messages, each message comprising at least a chat conversation ID and a conversation initiator ID, the combination of said chat conversation ID and conversation initiator ID being uniquely associated with one of said plurality of windows, said messages optionally containing control or user conversation information, means for updating respective ones of said windows based on messages having uniquely associated combinations of said chat conversation IDs and conversation initiator IDs.

* * * * *